(12) United States Patent
Williams

(10) Patent No.: US 7,350,828 B2
(45) Date of Patent: Apr. 1, 2008

(54) TUBE FITTING WITH SEALANT

(75) Inventor: Peter C. Williams, Cleveland Heights, OH (US)

(73) Assignee: Swagelok Company, Solon, OH (US)

( * ) Notice: Subject to any disclaimer, the term of this patent is extended or adjusted under 35 U.S.C. 154(b) by 301 days.

(21) Appl. No.: 10/518,869

(22) PCT Filed: Sep. 18, 2003

(86) PCT No.: PCT/US03/31021

§ 371 (c)(1),
(2), (4) Date: Dec. 17, 2004

(87) PCT Pub. No.: WO2004/027306

PCT Pub. Date: Apr. 1, 2004

(65) Prior Publication Data

US 2006/0012169 A1    Jan. 19, 2006

Related U.S. Application Data

(60) Provisional application No. 60/411,617, filed on Sep. 18, 2002.

(51) Int. Cl.
*F16L 35/00* (2006.01)
(52) U.S. Cl. .................. 285/245; 285/249; 285/3; 29/890.14
(58) Field of Classification Search ............ 285/3, 285/4, 245, 249, 323; 29/890.14
See application file for complete search history.

(56) References Cited

U.S. PATENT DOCUMENTS

| | | | |
|---|---|---|---|
| 1,334,130 A | 3/1920 | Blanchard | |
| 1,983,840 A | 12/1934 | Dohner | |
| 2,083,901 A | 6/1937 | Rector | |
| 2,150,042 A | 3/1939 | Shultz | |
| 2,251,717 A * | 8/1941 | Parker | 385/341 |
| 2,284,216 A * | 5/1942 | Kunkel | 285/331 |
| 2,330,841 A * | 10/1943 | Parker | 285/328 |
| 2,394,351 A * | 2/1946 | Wurzburger | 285/341 |
| 2,452,276 A | 10/1948 | Woodling | |
| 2,561,648 A | 7/1951 | Bradley | |
| 2,779,610 A * | 1/1957 | Risley | 285/323 |
| 3,167,333 A | 1/1965 | Hall et al. | |
| 3,467,413 A | 9/1969 | Madrelle | |
| 3,499,671 A * | 3/1970 | Osborne | 285/341 |
| 3,668,754 A * | 6/1972 | Boast | 29/890.15 |
| 3,684,322 A * | 8/1972 | Kotsakis | 285/343 |
| 3,830,532 A * | 8/1974 | Roberts | 285/341 |
| 3,857,591 A * | 12/1974 | Voss | 285/341 |

(Continued)

FOREIGN PATENT DOCUMENTS

DE    250744    10/1987

(Continued)

*Primary Examiner*—David Bochna
(74) *Attorney, Agent, or Firm*—Calfee, Halter & Griswold LLP

(57) ABSTRACT

A tube fitting (50) that uses two basic components, namely a fitting body (54) and a fitting nut (52). The nut (52) and body (54) are adapted to be threadably coupled together by relative rotation therebetween. The nut (52) includes an integral tube gripping ring (80) that may be separable from the nut upon pull-up of the fitting. The tube gripping ring and nut (52) form a trepan in which a sealant (400) is disposed.

26 Claims, 7 Drawing Sheets

U.S. PATENT DOCUMENTS

| | | |
|---|---|---|
| 3,857,597 A | 12/1974 | Voss |
| 4,309,050 A | 1/1982 | Legris |
| 4,500,117 A | 2/1985 | Ayers et al. |
| 4,629,221 A | 12/1986 | Lumsden et al. |
| 4,655,485 A | 4/1987 | Albrecht et al. |
| 4,682,797 A | 7/1987 | Hildner |
| 4,826,218 A * | 5/1989 | Zahuranec ............... 285/342 |
| 4,856,731 A * | 8/1989 | Rorick et al. ............ 242/480.4 |
| 5,725,259 A | 3/1998 | Dials |
| 5,961,160 A | 10/1999 | Frohlich |
| 6,123,364 A | 9/2000 | Inoue et al. |
| 6,361,083 B1 | 3/2002 | Riesselmann et al. |

FOREIGN PATENT DOCUMENTS

| | | |
|---|---|---|
| EP | 352143 | 1/1990 |
| EP | 0531068 A2 * | 8/1992 |
| GB | 866996 | 5/1961 |
| JP | 56124787 A2 * | 9/1981 |
| JP | 60139988 A2 * | 7/1985 |
| WO | WO 02/063194 | 8/2002 |
| WO | WO 02/063195 | 8/2002 |

\* cited by examiner

TUBE FITTING WITH SEALANT

RELATED APPLICATIONS

This application claims the benefit of U.S. Provisional patent application Ser. No. 60/411,617 filed on Sep. 18, 2002 for TUBE FITTING WITH INTEGRAL NUT, GRIPPING RING AND SEALANT, the entire disclosure of which is fully incorporated herein by reference.

FIELD OF THE INVENTION

The invention relates to tube fittings that are used to join or connect a tube or pipe end to another member, whether that other member be another tube or pipe end such as through T-fittings and elbow fittings, for example, or a device that needs to be in fluid communication with the tube or pipe end, such as for example, a valve. As used herein the terms "tube" and "tubing" are intended to include but not be limited to pipe as well.

BACKGROUND OF THE INVENTION

Recently, new tube fitting concepts has been described relating to non-flared type tube fittings. The new concepts relate to the use of a tube gripping device that is optionally either integral to one of the tube coupling members such as a nut or body, or separable therefrom. Such concepts are taught in International patent application nos. US02/03431 filed on Feb. 6, 2002, published on Aug. 15, 2003 as publication no. WO02/63195 for TUBE FITTING WITH SEPARABLE TUBE GRIPPING RING; and US02/03430 filed on Feb. 6, 2002, published on Aug. 15, 2003 as publication no. WO02/63194 for TUBE FITTING FOR STAINLESS STEEL TUBING, the entire disclosures of which are fully incorporated herein by reference.

The present invention is directed to further enhancements of such concepts.

SUMMARY OF THE INVENTION

A preferred embodiment of the present invention provides a tube fitting having two assembly components, namely a fitting body and a fitting nut. The nut and body are adapted to be threadably coupled together (referred to herein as "pull-up" of the fitting) by relative rotation therebetween. The nut includes an integral tube gripping element that cooperates with a camming surface on the body when the fitting is pulled-up. In an exemplary embodiment the tube gripping element is realized in the form of a gripping ring. The gripping ring may be machined with the nut or separately attached thereto by any convenient process such as brazing, welding or soldering, for example. The gripping ring may also be designed to separate from the nut during pull-up of the fitting.

The gripping ring functions in many respects like a ferrule and is radially compressed and plastically deformed against the tube outer wall to form a seal and a tight tube grip. The gripping ring also forms a primary seal against the body camming surface. The ring in one embodiment is designed to have a hinging action and to plastic deform during pull-up to embed the nose portion into the tubing wall for excellent tube grip, and an axially adjacent swage or collet zone. In another embodiment, the tube gripping element separates from the component to which it is attached and operates as a separate component exhibiting seal and tube gripping characteristics similar to those of the nondetachable tube gripping ring.

The fitting components, and particularly the tube gripping element, are preferably but not necessarily case hardened. The new fitting is especially useful as a stainless steel and other metal tube fitting, although the invention is not limited to any particular class or type of metals. In accordance with another aspect of the invention, the fitting may include a self-gauging feature to indicate sufficient pull-up and to prevent excessive tightening of the components.

In accordance with another aspect of the invention, a nut and tube gripping element combination provides a surface outward the tube gripping element to which a sealant is applied. The surface in one embodiment forms part of a trepan area or volume that may be used to hold the sealant. This sealant functions as a back up seal for the tube fitting, especially for a primary seal formed between the tube gripping element and the camming surface. In the exemplary embodiment the backup seal is formed outward of the seal made between the tube gripping element and the camming surface of the body. In accordance with another aspect of the invention, in, one embodiment, a sealant is deposited in the nut and allowed to collect in the nut trepan. The sealant may be, for example and not by way of limitation, a grease or paste such as a viscous hydrocarbon of fluorocarbon grease, or as another example and not by way of limitation the sealant may be a soft metal, elastomer, plastic insert or plastic film or other softer sealing surface. The sealant may be applied, for example, in a liquid carrier suspension with nut in the open end up position. As the liquid carrier evaporates, the sealant becomes more concentrated across the floor of the nut trepan. Upon pull-up of the tube fitting, the sealant is squeezed and becomes compressed between the end of the body and the trepan floor, thereby creating a fluid seal that greatly minimizes any potential leak path between the body and the nut. Alternatively the sealant may be applied to a portion of the mating body that engages the trepan during pull-up.

Use of the sealant is compatible with an optional self-gauging feature of the tube fitting concepts described herein. The sealant concept may be utilized in many tube fitting designs other than the exemplary embodiments herein, wherein a sealant can be applied to one or more surfaces that during make-up of the fitting either abut or very nearly abut so as to squeeze the sealant between the two surfaces. Such surfaces may be, for example and not by way of limitation, be provided on the tube fitting components such as a nut and body that are joined by any suitable arrangement so as to cause the tube gripping element therebetween to grip and seal a tube end.

The sealant may be applied at the manufacturer or in the field prior to assembly. The invention further contemplates the method embodied in the application and use of a sealant for forming a backup seal to a primary seal formed in a fitting between two surfaces that are outward the primary seal area. These and other aspects and advantages of the present invention will be apparent to those skilled in the art from the following description of the preferred embodiments in view of the accompanying drawings.

DETAILED DESCRIPTION OF THE INVENTION

Figure 1A:
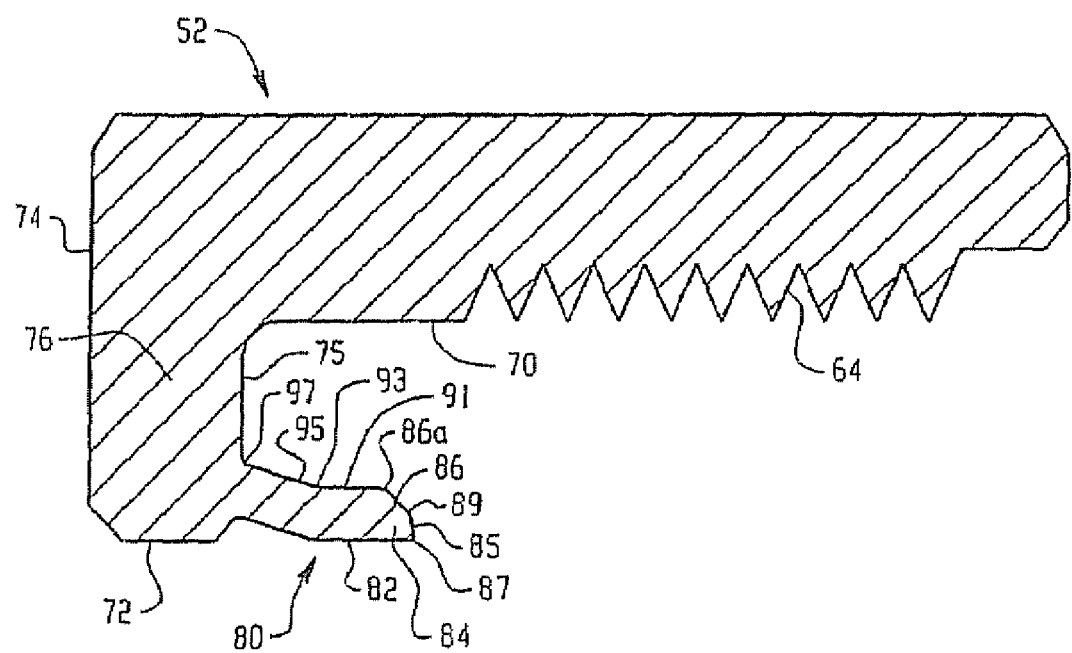
FIG. 1A is a cross-sectional half view of a portion of an exemplary female threaded fitting nut suitable for use with the present invention detailing the area of the nut trepan and an integral tube gripping device.

The present invention contemplates techniques to enhance sealing a connection formed in a fitting of the type that uses two fitting components, such as for example an nut and body, and one or more conduit gripping elements therebetween that seal and grip a conduit end. For example and not by way of limitation, the invention may be used with a tube fitting that utilizes a nut and tube gripping device wherein the tube gripping device may either remain integral with the nut after pull-up of the fitting or separate from the nut during pull-up of the fitting. In one of the broad aspects of the invention, a sealant is provided between two surfaces of the tube fitting components such as a nut and body that abut or nearly abut upon pull-up of the fitting. The tube gripping device in some embodiments functions as a ferrule, and the present invention may be used in tube fittings that use a single or plural tube gripping devices. The nut and tube gripping device system of this invention is useful for joining or connecting a tube end to another member such as a second tube end or other flow element such as for example a valve. Note that in the drawings the fittings are illustrated in longitudinal cross-section but only half of the section is illustrated, it being understood that the other half is identical and omitted for clarity and ease of illustration. In all of the illustrations herein, various gaps and dimensions are somewhat exaggerated for ease of illustration. The invention described herein is applicable to any metal conduit including tubing and pipe.

While the present invention is described herein with reference to specific exemplary embodiments and the known best mode for practicing the invention, such description is intended to be exemplary in nature and is not to be construed in a limiting sense. The present invention will find application to many different tube fitting configurations readily apparent to those skilled in the art upon learning the teachings herein. Furthermore while various aspects of the invention may be illustrated and/or described herein as being used in combination with each other, such descriptions and illustrations are provided for ease of explanation and should not be construed in a limiting sense. Various additional combinations and sub-combinations of the different aspects of the invention may be used whether expressly described herein or not. Still further, one or more aspects of the invention may be described herein along with one or more alternative embodiments, structures, materials or steps. Such additional alternative embodiments are intended to be exemplary and should not be construed as a exhaustive list of the available alternative embodiments, whether known or later discovered.

Figure 1B:
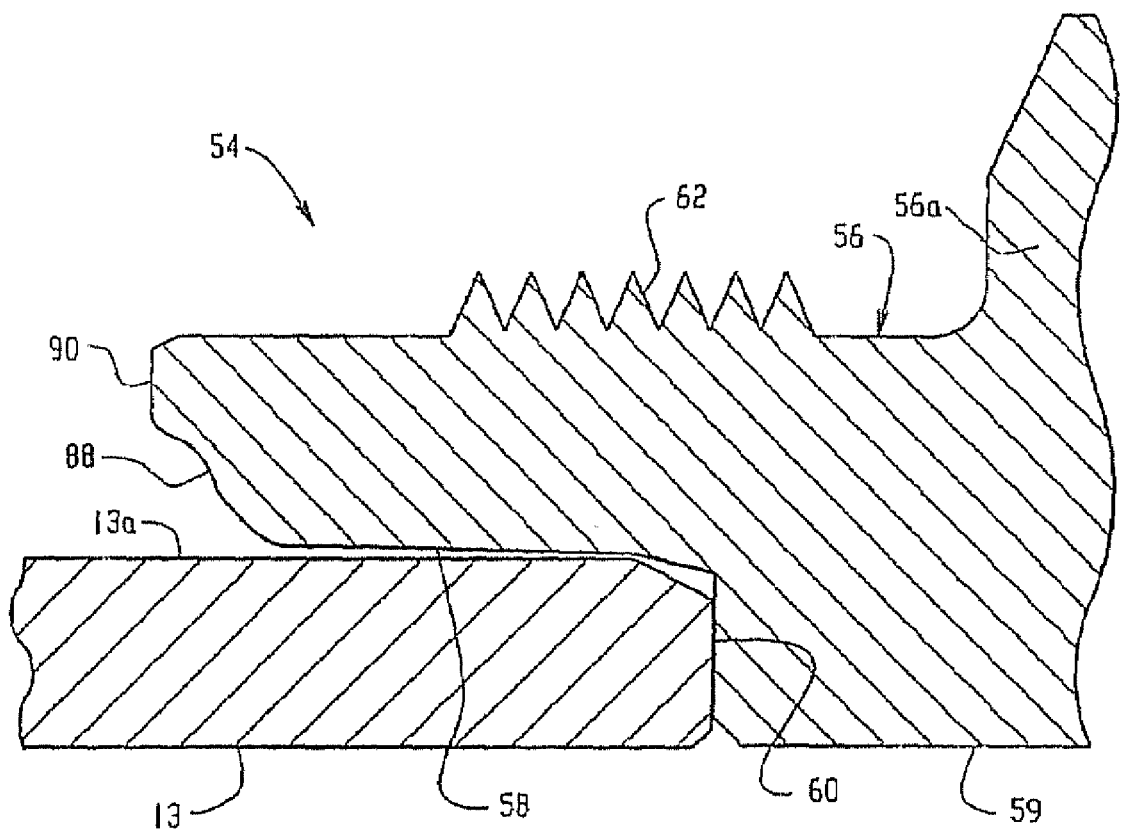
FIG. 1B is a cross-sectional half-view of an exemplary male threaded fitting body suitable for use with the present invention.

With reference to FIGS. 1A and 1B, the present invention contemplates a tube fitting 50 comprising two discrete fitting components, namely a female threaded nut 52 and a male threaded body 54. The body 54 is a generally cylindrical main body 56 that has an integral extension or end 56a. The body 56 includes a first central longitudinal bore 58 that is appropriately sized to closely and slideably receive a conduit (tube or pipe) end 13. The first bore 58 is somewhat larger in diameter than a coaxial second bore 59 that extends through the end extension 56a of the body 54. Note that if the fitting 50 is a closed end connection, the inner bore 59 either would be omitted or would not be a through bore. The tube end 13 preferably bottoms against a counterbore 60. The body 56 is machined or otherwise formed with external male threads 62 that threadably mate with corresponding female threads 64 formed or machined in the nut 52. The nut and body, however, need not have a threaded connection but rather may alternatively be joined by any suitable technique. For example, a clamping arrangement or bolted flanges may be used.

As shown in FIG. 1A, the nut 52 includes a first central bore 70 and a smaller diameter bore 72. The first bore 70 terminates at a location that is axially spaced from the nut back end 74 to form a surface 75 which in this embodiment forms a trepan or recessed volume, such that the nut 52 includes a radially inwardly extending collar 76. The collar 76 is defined generally by the back end wall 74 of the nut 52, the smaller diameter bore 72 and the larger diameter bore 70. The surface 75 is outward (radially) the forward surfaces 85, 86 and 89 of the tube gripping element that contact a camming surface (88) of the body described hereinbelow. The nut 52 further includes a tube gripping device 80 that extends axially inwardly in a somewhat cantilevered fashion from the collar 76. The tube gripping device is in the general form of a gripping ring and includes an inner bore 82 that defines a generally cylindrical wall that closely receives the tube end 13.

Although the terms tube gripping device and tube gripping ring are used interchangeably herein, it should be understood that the term tube gripping device is intended to be more general in meaning and may include not only ring shaped elements but other shapes and designs that achieve the tube grip and seal functions. Moreover, the present invention is not limited to any particular design aspect of the fitting components, be it the nut, body or tube gripping device. The invention may be used in many different tube fitting configurations. Reference may be made to the two above incorporated publications for additional understanding and options available for the design of the tube fitting components including the nut, body and tube gripping device, however, the present invention is not limited to its use in such designs.

The cylindrical wall that defines the gripping ring bore 82 extends axially from a tapered front or nose portion 84 of the gripping ring 80. The nose portion 84 includes an axially tapered outer surface 86 that increases in the radial dimension towards the back end of the gripping ring 80. The tapered outer surface 86 extends from a generally radial front end 85 of the gripping ring 80. This generally radial front end 85 may have a small angle or taper and joins to the inner cylindrical bore 82 at a preferably sharp corner 87. The tapered surface 86 joins the front end 85 preferably by a radius portion 89 and at its axial opposite end by a radius 86*a* to a generally cylindrical portion 91, which in turn joins via a radius 93 to a tapered outer wall portion 95. The tapered outer wall portion 95 joins along a radius 97 to the trepan or surface 75.

The body 54 includes an interior bore 58 that receives a tube or pipe end 13. Preferably the tube end 13 bottoms against a counterbore surface 60 as is known. The body 54 includes a threaded portion 62 that threadably mates with the nut threads 64. The body 54 may be a separate member or may be attachable to or integral with a fluid device such as a valve, manifold, tubing or pipe and so on. The body 54 further includes a camming surface 88 against which the forward portion 84 of the tube gripping element 80 engages and cams during pull-up of the tube fitting. The particular geometry of the camming surface 88 may be selected as required for a particular application. Reference may be made to the above incorporated publications for various design considerations and options however the present invention is not limited to use with such options and features. For example, while a preferred camming surface 88 angle θ is about 45 degrees, the present invention may be used in tube fittings that have camming surface angles from about 12 degrees and higher.

The body 54 further includes a surface 90 that generally defines the outer end or back wall of the component. When the tube fitting is assembled the surface 90 is outside (radially) the camming surface 88 and a seal formed between the camming surface 88 and the forward portion 84 of the tube gripping element 80.

Figure 2A:
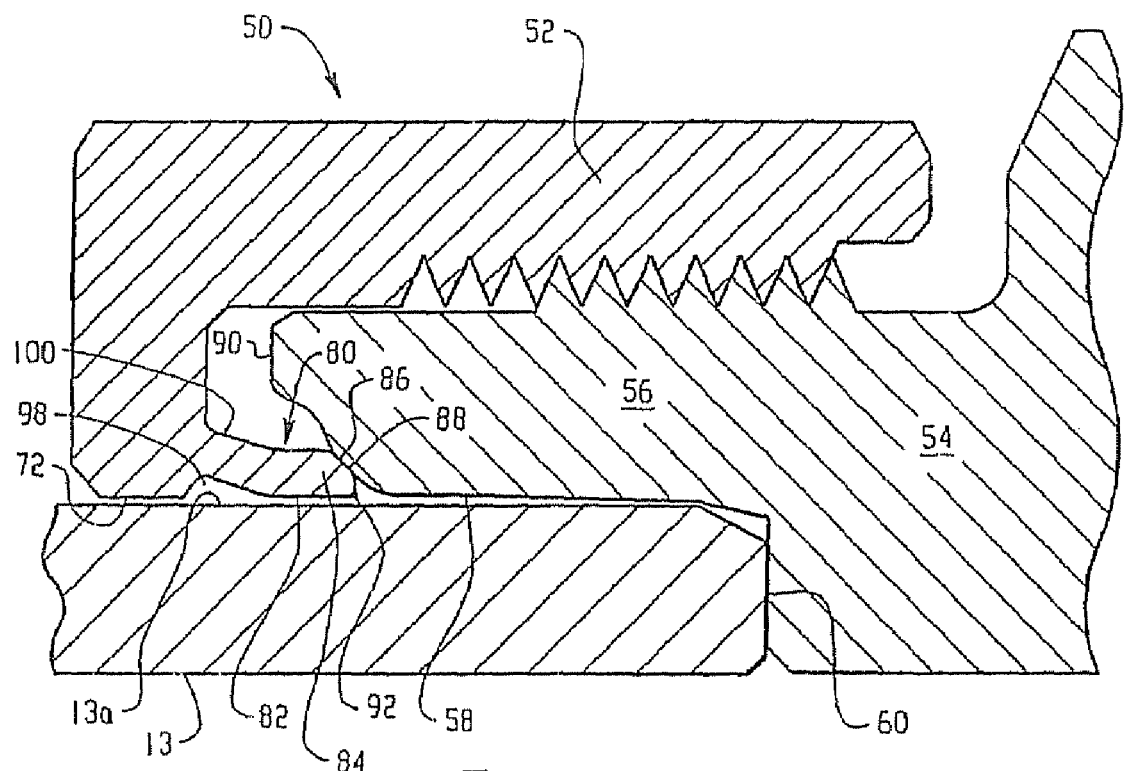
FIG. 2A is a cross-sectional half view of the threaded fitting nut of FIG. 1A engaged with the threaded fitting body of FIG. 1B to form an assembled tube fitting in a finger tight condition.
Figure 2B:
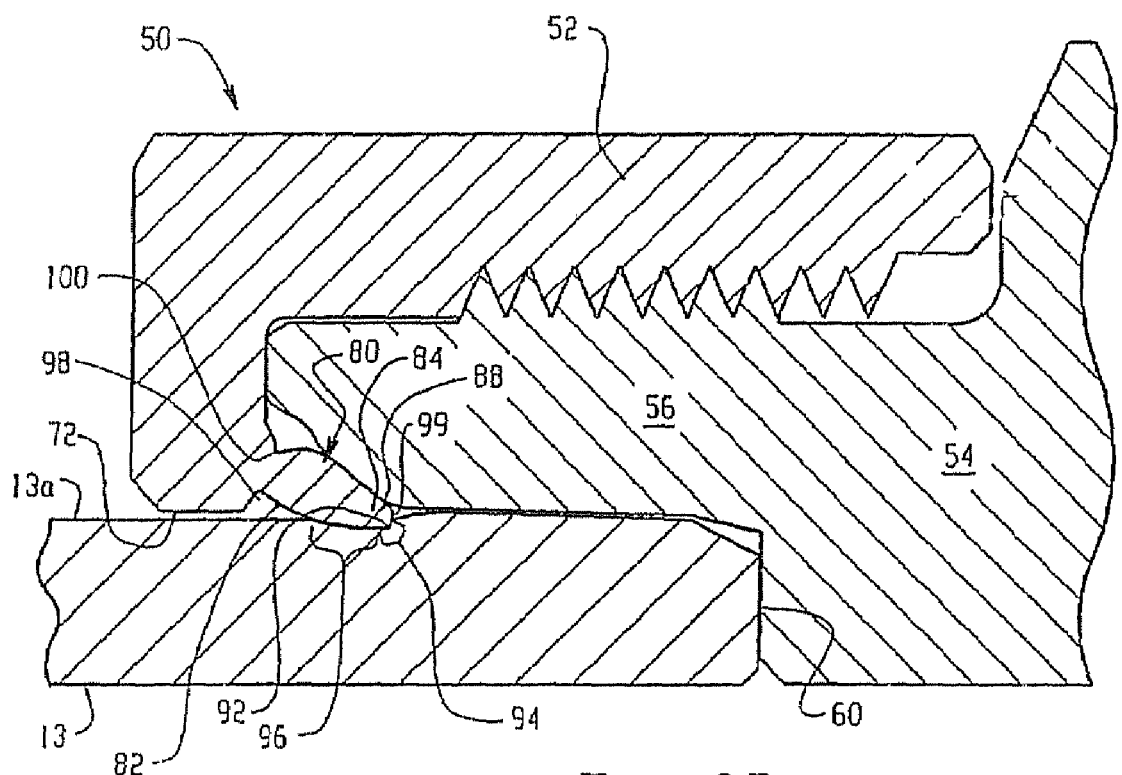
FIG. 2B is a cross-sectional half view of the tube fitting of FIG. 2A wherein the fitting is illustrated in a "pulled-up" condition.

With reference to FIGS. 2A and 2B, when the fitting is assembled to final assembled condition (referred to herein as "pull-up"), the nut and body are tightened together by relative rotation therebetween, and the tapered nose portion 84 initially engages an axially tapered camming surface 88 that forms an opening to the tube bore 58 in the main body 56. The tapered camming surface 88 is a surface that joins the bore 58 wall to the back end wall 90 of the body 54.

In this embodiment, the gripping device 80 is shaped to effect several functions of the fitting 50. The gripping device 80 provides, upon proper pull-up, a fluid-tight primary seal against the tapered camming surface 88. This seal may be a primary outer seal for the tube fitting 50, or may in effect be a secondary or back-up seal to any seal formed between the tube end 13 and the body 54, for example along the bore wall 58 and/or the counterbore 60. The gripping device 80 also will form a primary seal at the location where the gripping device 80 embeds into the outer surface of the tube end 13 in the area where the cylindrical bore 82 of the gripping ring 80 engages the tube end outer surface 13A. Again, this seal may in effect be a back-up or secondary seal to any seal formed by the tube end 13 against the body 54. In any event, the gripping ring 80 forms primary seals against the camming surface 88 and the outer surface of the tube end 13. In addition, the gripping ring 80 must adequately grip the tube end 13 so as to maintain seal integrity.

In the embodiment of FIGS. 2A and 2B, the nut 52 and the body 54 are axially dimensioned so that upon proper pull-up, for example a one-half-turn of the nut 52 relative to the body 54, the back wall 90 of the body 54 axially contacts or abuts the trepan surface 75. This feature thus incorporates an optional self-gauging aspect to the fitting 50 due to a substantial and immediate increase in torque to thereby indicate to the assembler sufficient pull-up and to prevent over-tightening of the nut 52.

In order to achieve a fluid-tight seal and tube gripping action, the gripping ring 80 is designed to be plastically deformed and swaged into the tube end upon pull-up, as illustrated in FIG. 2B. This result is achieved by designing the gripping ring 80 to have an optional hinging action whereby the tapered nose portion 84 is not only driven axially forward as the nut 52 is threaded onto the body 54, but also is radially displaced or driven into engagement with the outer surface 13A of the tube end 13 wall in a controlled and predetermine manner. The forward end 92 of the nose portion 84 is thus compressed and embedded into the tubing wall with a resultant stress riser or bite in the region designated 94 in FIG. 2B. The forward end bite region 94 produces a generally radially extending wall or shoulder 99 formed out of the plastically deformed tube end material. The shoulder 99 engages the embedded forward end 92 of the gripping ring 80 to thus form an exceptionally strong mechanical resistance to tube blow out at higher pressures. The embedded nose portion 92 thus provides both an excellent seal and a strong grip on the tube end 13. The gripping ring 80 is further designed to exhibit the aforementioned radially inward hinging action so as to swage or collet the cylindrical wall 82 against the tube end at a location axially adjacent or rearward of the stress riser bite 94 and generally designated with the numeral 96.

In order to achieve the desired swaging action and tube grip, the gripping ring 80 is designed to exhibit the hinging action that allows the tapered nose portion 84 and the central or mid-portion (as at the region of the cylindrical bore 82 or the region designated 96) of the gripping ring 80 to be radially inwardly compressed as it engages with the tapered camming mouth 88 of the body 56. This hinging action is also used to provide a significant radial displacement and compression of the cylindrical wall 82 to swage the gripping ring 80 onto the tube end 13 axially adjacent to or spaced from the stress riser 94. In the embodiment of FIGS. 2A and 2B, the hinging action is facilitated by providing a preferred although not uniformly required radial inner circumferential notch 98 that is axially positioned between the generally cylindrical wall portions 72 and 82. The notch 98 is suitably shaped to permit the gripping ring 80 to plastically deform and collapse in a controlled manner so as to radially compress the cylindrical wall 82 against the tube end with the desired collet effect. This result may be enhanced by including an outer notch 100 in the outer wall portion of gripping ring 80. The particular geometry of the gripping ring 80 will thus be designed so that as the nut 52 is threaded onto the body 54, the gripping ring 80 hinges and plastically deforms to grip the tube end and to seal both against the tube end 13 and the tapered camming mouth 88.

It should be noted that while the exemplary embodiments herein relate to a tube gripping element that is designed to hinge and plastically deform in a desired manner, such design features are optional for the present invention directed to the use of a sealant. Thus, the present invention will find application in other tube fitting designs that may not use or require a hinging action or a tube bite or indentation. The present invention is rather more broadly directed to the use of a sealant as a backup seal to a seal formed between the tube gripping element and a surface of the fitting components, wherein the sealant is provided and squeezed between two abutting or near abutting surfaces located outward the tube gripping element seal and wherein the tube gripping element grips the tube in any suitable manner such as by a tube bite, indentation, colleting, friction and so on.

Figure 3:
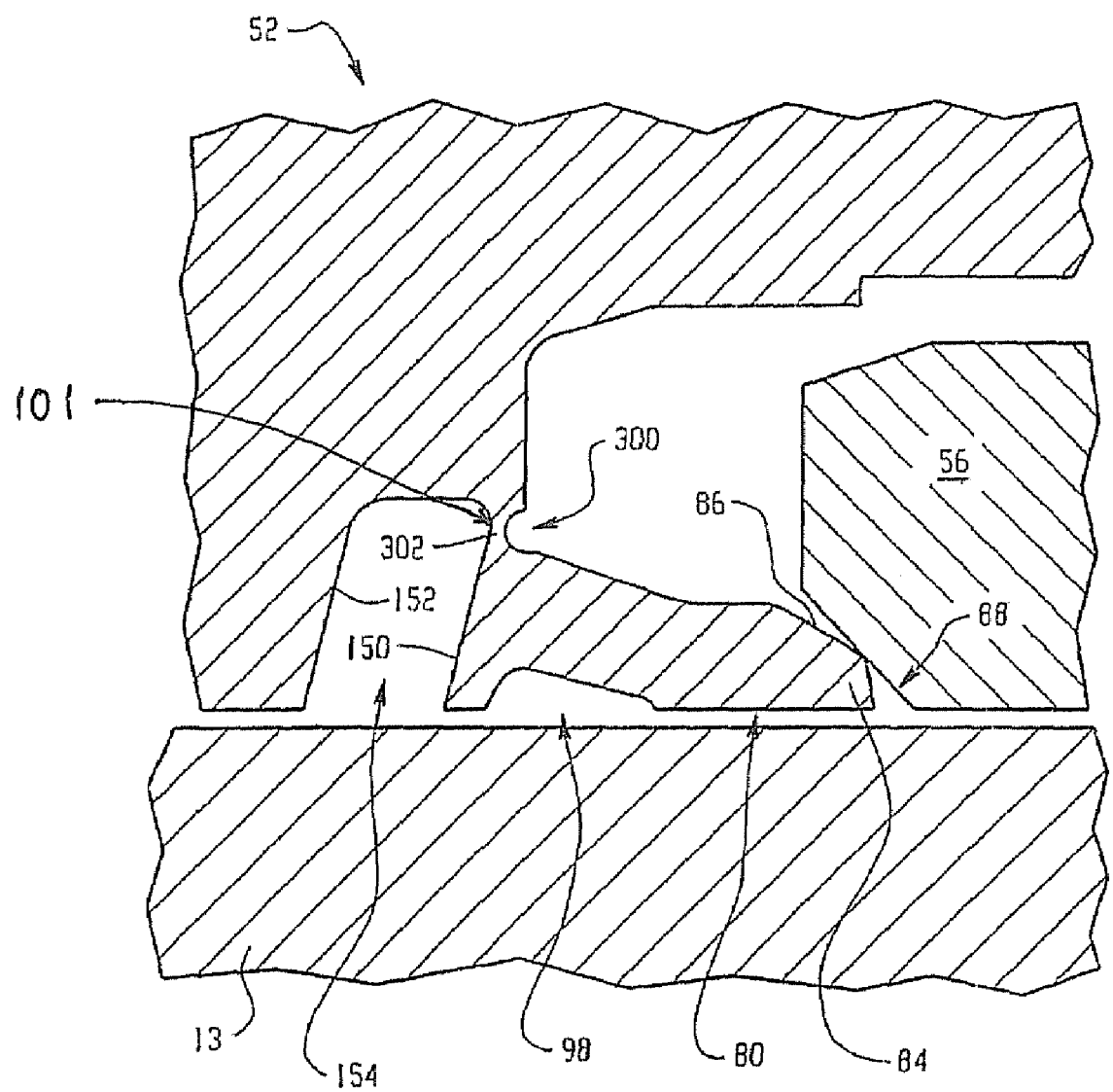
FIG. 3 is a cross-sectional half view of another embodiment of a tube fitting suitable for use with the present invention.

As illustrated in FIG. 3, in an alternate embodiment of the present invention, the tube gripping device 80 is attached to the female threaded nut 52 by a thin frangible web portion 101. This web portion 101 breaks when the gripping ring 80 cams initially against the camming surface 88 during pull-up so that the tube gripping device 80 becomes a separate piece and functions with the nut and body in effect as a single ferrule fitting. The separated gripping ring 80 has a back end 150 that is axially driven by a radially inwardly extending wall 152 of the nut 52 that serves as a drive surface for driving the gripping ring 80 forward, against the camming surface 88 for completing an initial pull-up. The gripping ring 80 is machined with the frangible web portion 101 by forming a somewhat radial groove 154 that is angled generally toward the inside of the female threaded nut 52. This groove 154 forms the back end 150 of the gripping ring 80 and also the radial wall 152 of the nut that drives the gripping ring 80 axially against the camming surface 80 after the gripping ring 80 separates from the nut 52.

As shown in FIG. 3, an optional stress concentrating notch 300 may be formed in the frangible web portion 101. This stress concentrating notch 300 is formed as a generally tight radius that creates a thinner web of material 302 to promote a rapid clean break of the ferrule 80 from the nut 52. The break thus occurs as a result of a minimal span of rotation of the nut 52 shortly past finger tight position.

Figure 4A:
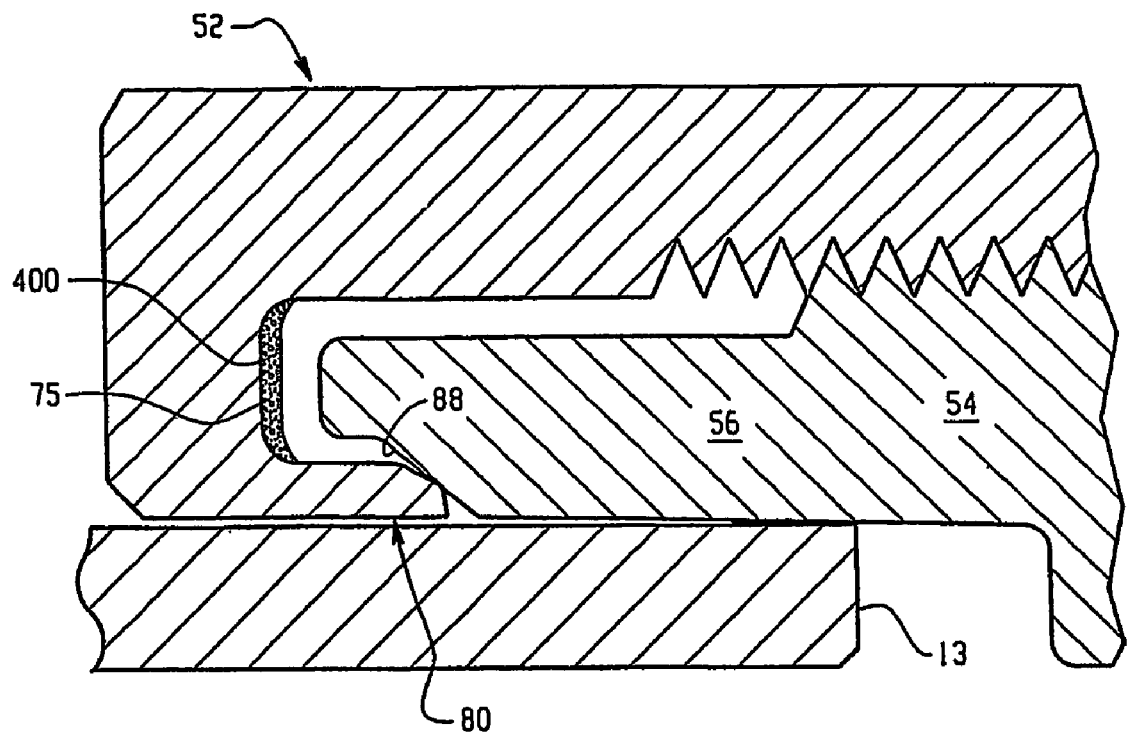
FIG. 4A is a cross-sectional half view of the threaded fitting nut of FIG. 1A engaged with the threaded fitting body of FIG. 1B in a finger tight condition and showing a sealant in the trepan area of the threaded fitting nut.

In accordance with one aspect of the invention, the seals formed between the body 56 and the nut 52 may be enhanced or backed up by providing a sealant 400 that is deposited or applied to one or more surfaces of the nut 52 or the body 54, in the exemplary embodiment on the nut trepan surface 75 (see FIG. 4A). The sealant 400 is applied so as to be squeezed between two surfaces that are outward from a seal region of the tube gripping device 80 so as to function as a backup seal. In the exemplary embodiments herein the surfaces 75, 90 extend generally radially relative to the longitudinal axis of the conduit 13 end. As used herein the terms "primary" and "secondary" and "backup" are used for convenience and ease of explanation and should not be construed as a limitaion of the functional characteristics of the seal provided by the sealant.

The sealant 400 may be, for example, a grease or paste such as a viscous hydrocarbon or fluorocarbon, or it may be for example a soft metal, elastomer or plastic film or other suitable surface treatment. A suitable soft metal is lead for example; a suitable plastic for example is any ultrahigh molecular weight polyethylene, or PTFE; and a suitable elastomer is for example a silicon rubber. These examples are not intended to be an exhaustive list.

The sealant 400 may be applied, if required, in a liquid carrier suspension with the nut 52 in the open end up position. As the liquid carrier evaporates, the sealant 400 becomes more concentrated across the floor of the nut trepan 75.

Figure 4B:
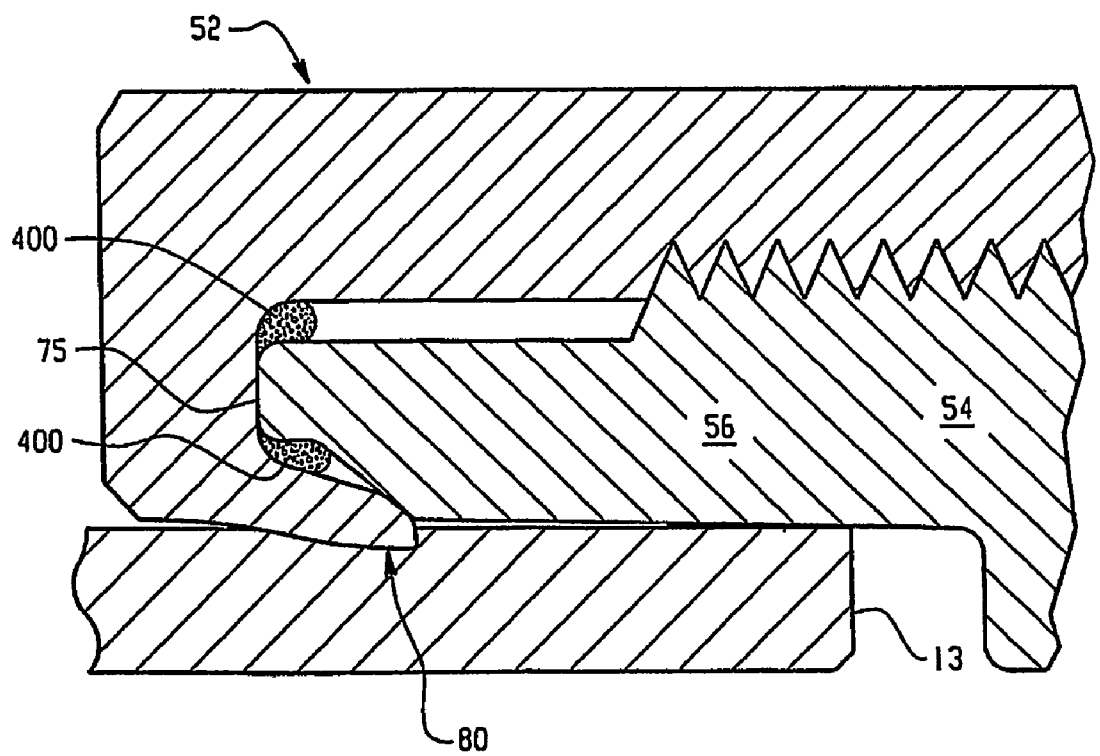
FIG. 4B is a cross-sectional half view of the threaded fitting nut of FIG. 1A engaged with the threaded fitting body of FIG. 1B showing the behavior of a sealant deposited in the trepan area of the threaded fitting nut when the fitting body has been "pulled-up" against the fitting nut.
Figure 5A:
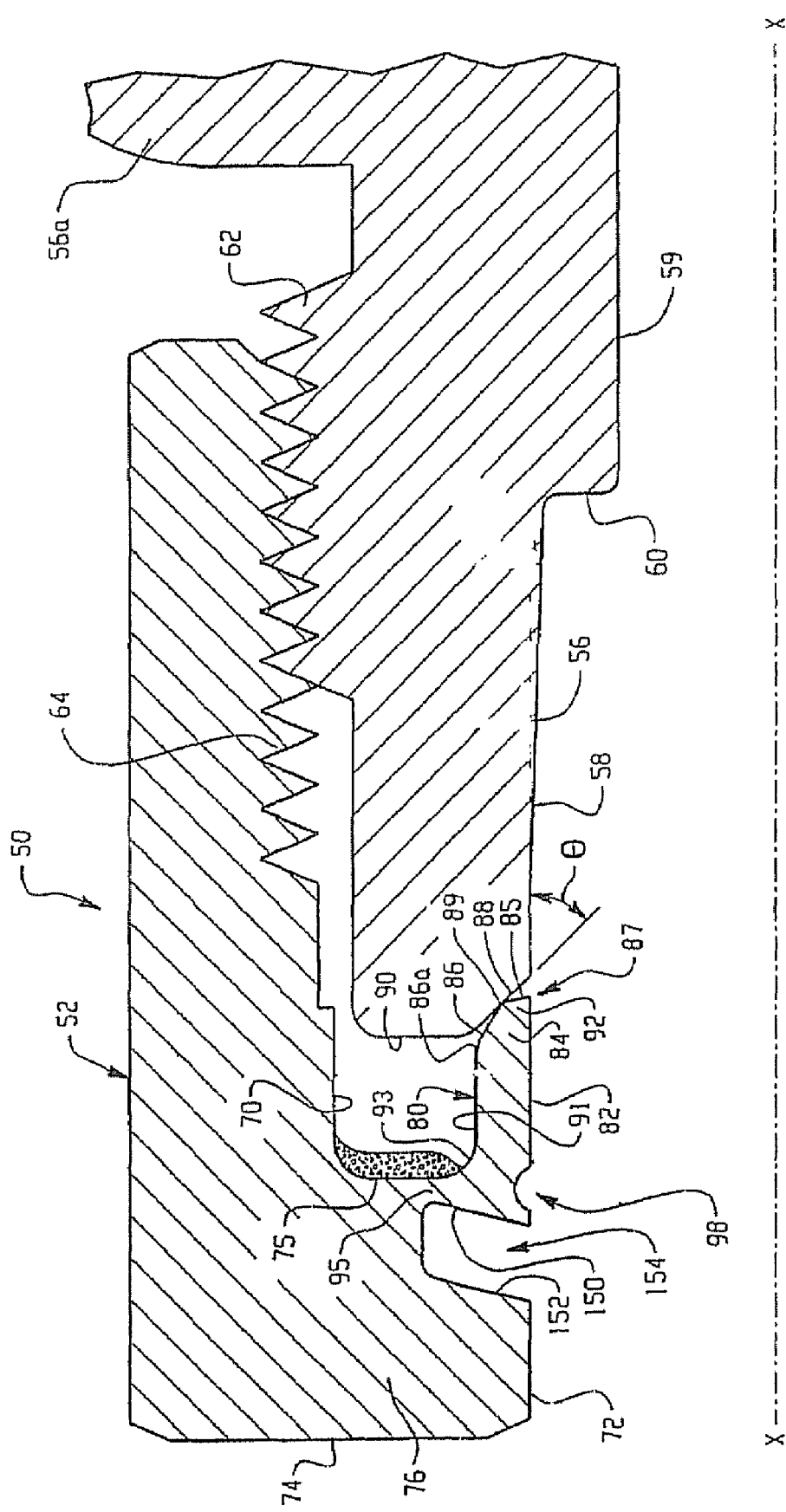
FIGS. 5A-5C illustrate another embodiment of the invention using a separable tube gripping element.
Figure 5B:
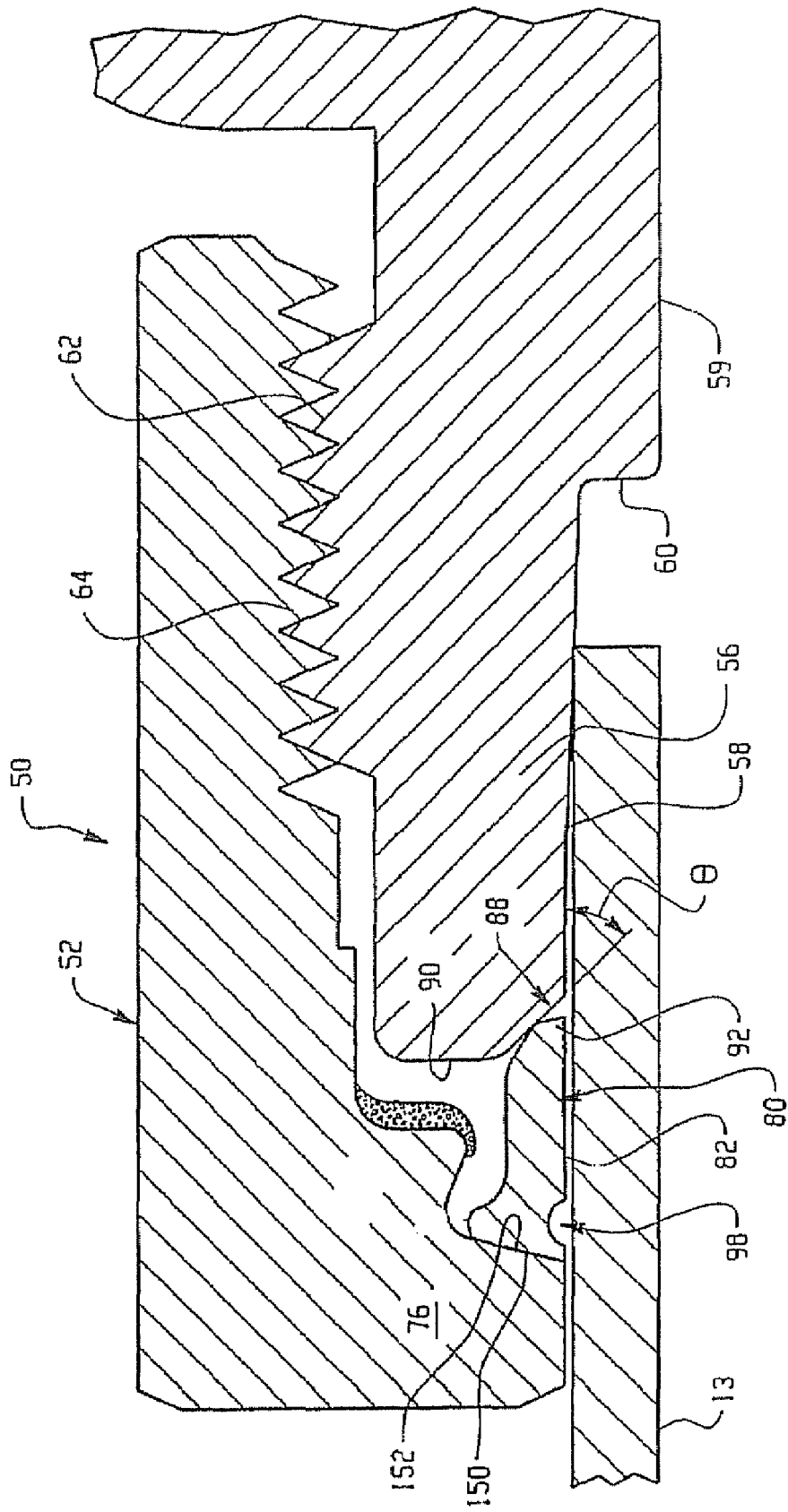
Figure 5C:
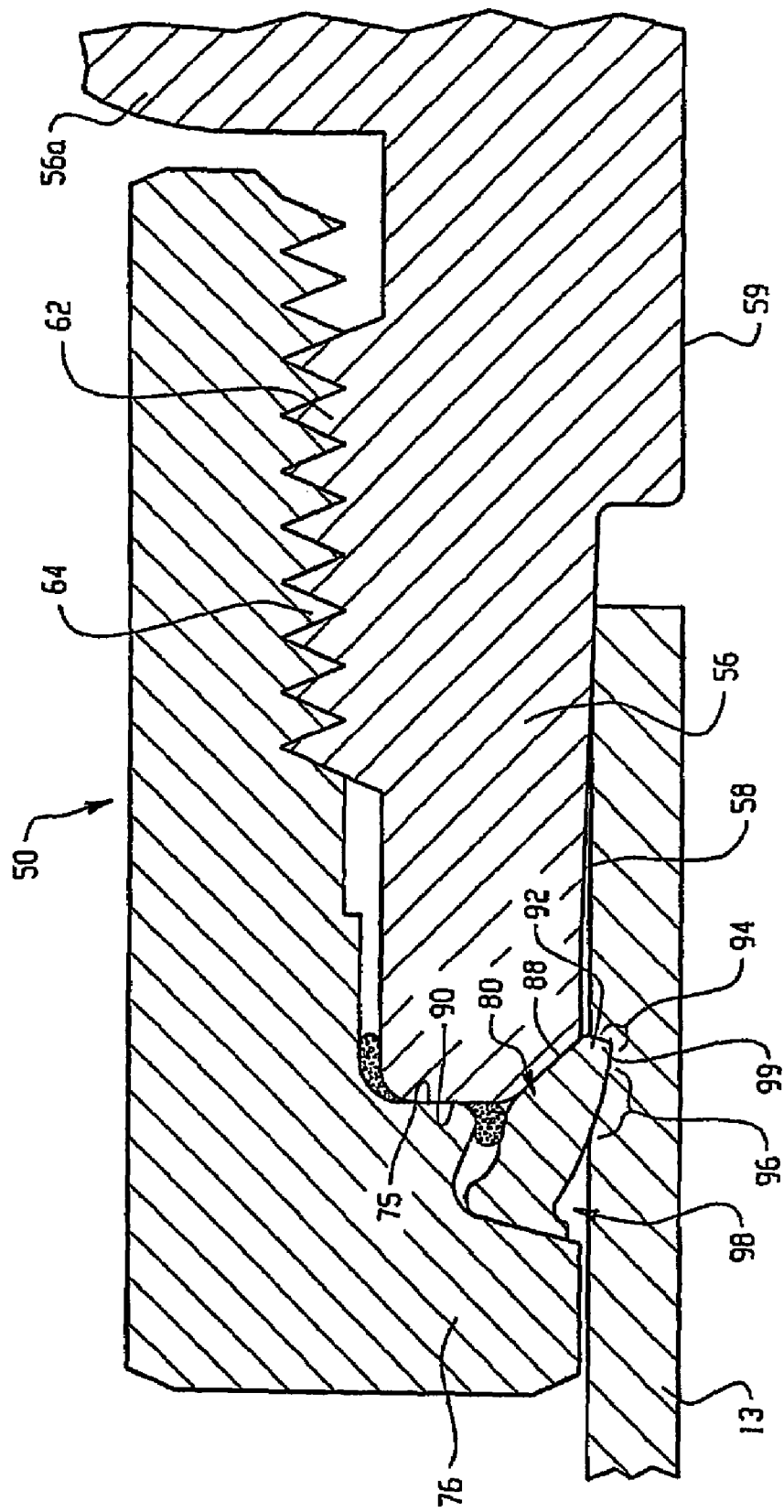

As shown in FIG. 4B, upon pull-up of the tube fitting, the sealant 400 is squeezed between the nut 52 and the body 54 and becomes, for example, compressed between the end 90 of the main body 56 and the trepan floor, thereby creating a fluid seal that functions as a backup seal for the primary seal formed between the tube gripping device 80 and the camming surface 88. The sealant 400 preferably is provided in sufficient volume to fill all voids between the nut 52 and the body 54 in the trepan region 75, and especially near the camming surface 88. The inclusion of the sealant 400 is compatible with all embodiments of the present invention disclosed herein. For example, as illustrated in FIGS. 5A-5C, the sealant may be used with a fitting that uses the separable tube gripping element 80. Still further, it should be noted that although the preferred embodiments illustrate the sealant 400 being applied to the trepan area, the sealant 400 may be applied or additionally applied to the back end wall 90 or other suitable surface to achieve the back up seal function when the fitting is pulled up. More than one type of sealant 400 may also be used for a fitting. Still further, the sealant 400 may be applied at the manufacturing sight, or later applied in the field by the user prior to assembly of the fitting.

The invention has been described with reference to the preferred embodiments. Clearly, modifications and alterations will occur to others upon a reading and understanding of this specification. It is intended to include all such modifications and alterations insofar as they come within the scope of the appended claims or the equivalents thereof.

What is claimed:

1. A tube fitting, comprising:
   a first fitting component having an interior bore adapted to receive a conduit end and a camming surface at one end thereof, wherein said first fitting component has an annular end surface outside said camming surface;
   a conduit gripping element;
   second fitting component that is joinable with the first fitting component such that the conduit gripping element is forced into engagement with said camming surface of the first fitting component, wherein the second fitting component defines an interior end surface that is radially outward of the conduit gripping element;
   a sealant material disposed in the second fitting component that upon pull-up of the fitting is on the internal end surface of the second fitting component and on the annular end surface of the first fitting component and is squeezed between said annular end surface of the first fitting component and the internal end surface of the second fitting component.

2. The fitting of claim 1 wherein said annular end surface of the first fitting component and the internal end surface of the second fitting component extend generally radially relative to a longitudinal axis of the fitting.

3. The fitting of claim 1 wherein said first fitting component is a male threaded body and said second fitting component is a female threaded nut.

4. The fitting of claim 3 wherein said components comprise metal.

5. The fitting of claim 4 wherein said metal comprises stainless steel.

6. The fitting of claim 1 wherein said conduit end is a tubing end.

7. The fitting of claim 1 wherein said conduit end is a pipe end.

8. The tube fitting of claim 1 wherein said sealant comprises a soft metal, plastic, elastomer, viscous hydrocarbon or fluorocarbon grease, paste, or film.

9. The tube fitting of claim 1 wherein said sealant forms a backup seal for said conduit gripping element.

10. The tube fitting of claim 1 wherein said conduit gripping element extends from said second fitting component in a cantilevered manner.

11. The tube fitting of claim 1 wherein said sealant is in a liquid carrier suspension.

12. A tube fitting, comprising:
    a first fitting component having an interior bore adapted to receive a conduit end and a camming surface at one end thereof,
    a conduit gripping element;
    second fitting component that is joinable with the first fitting component such that the conduit gripping element is forced into engagement with said camming surface of the first fitting component, wherein the second fitting component defines an interior end surface that is radially outward of the conduit gripping element;

a sealant material disposed in the second fitting component that is compressed between the first fitting component and the interior end surface of the second fitting component upon pull-up of the fitting;

wherein said conduit gripping element is attached to the second fitting component and wherein said interior end surface of said second fitting component is an end surface of a trepan that is defined radially outward of said conduit gripping element.

13. A tube fitting, comprising:

a first fitting component having an interior bore adapted to receive a conduit end and a camming surface at one end thereof, a conduit gripping element;

second fitting component that is joinable with the first fitting component such that the conduit gripping element is forced into engagement with said camming surface of the first fitting component, wherein the second fitting component defines an interior end surface that is radially outward of the conduit gripping element;

a sealant material disposed in the second fitting component that is compressed between the first fitting component and the interior end surface of the second fitting component upon pull-up of the fitting;

wherein said conduit gripping element is attached to the second fitting component and is separable from said second fitting component upon pull-up of the fitting.

14. A tube fitting, comprising:

a body having an interior bore adapted to receive a conduit end; said bore having a camming surface at one end thereof;

a nut that is joinable with the body, the nut including an attached conduit gripping element, wherein the nut defines an interior end surface that is radially outward of the conduit gripping element;

a sealant material disposed in the nut that is squeezed between the body and the interior end surface of the nut upon pull-up of the fitting.

15. The fitting of claim 14 wherein said sealant is disposed in a trepan of said nut and wherein said interior end surface of the nut is an end surface of the trepan.

16. The fitting of claim 14 wherein said conduit end comprises a tubing or pipe end.

17. The fitting of claim 14 wherein said conduit end comprises stainless steel.

18. The fitting of claim 14 wherein said conduit gripping element is separable from said nut upon pull-up of the fitting.

19. A component of a fitting for gripping and sealing a conduit end, comprising:

a nut having an interior surface;

a gripping element attached to said nut;

a trepan with an end surface that is radially outward of the gripping element; and a sealant disposed inside said nut in contact with the trepan end surface.

20. The component of claim 19 wherein said sealant is disposed in said trepan as a backup seal outward a gripping element seal area.

21. The component of claim 19 wherein said sealant comprises a soft metal, plastic, elastomer, viscous hydrocarbon or fluorocarbon grease, paste, or film.

22. The component of claim 19 wherein said gripping element is separable from said fitting component.

23. The component of claim 19 wherein said sealant is in a liquid carrier suspension.

24. A method of forming a seal between a threaded fitting nut, a threaded fitting body, and a tube, wherein said threaded fitting nut further comprises both a trepan and a tube gripping element that engages said tube when said threaded fitting body is pulled up against said threaded fitting nut, comprising:

depositing a sealant in said trepan of said threaded fitting nut;

placing said threaded fitting nut around said tube;

engaging said threaded fitting body with said threaded fitting nut;

tightening said threaded fitting body onto said threaded fitting nut such that said tube gripping element deforms and embeds itself in said tube and said sealant is squeezed between an end wall of the trepan and the fitting body and forms a fluid seal around the nut, body and tube.

25. The method of claim 24, wherein said sealant is a soft metal, plastic, elastomer, viscous hydrocarbon or fluorocarbon grease, paste, or film.

26. The method of claim 24, wherein said sealant is applied in a liquid carrier suspension to said threaded fitting nut when said nut is the open end up position tube end.

* * * * *